US012296803B2

(12) United States Patent
Ogino

(10) Patent No.: US 12,296,803 B2
(45) Date of Patent: May 13, 2025

(54) DRIVING ASSISTANCE DEVICE FOR VEHICLE

(71) Applicant: SUBARU CORPORATION, Tokyo (JP)

(72) Inventor: Shuu Ogino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 116 days.

(21) Appl. No.: 17/853,133

(22) Filed: Jun. 29, 2022

(65) Prior Publication Data

US 2023/0022820 A1    Jan. 26, 2023

(30) Foreign Application Priority Data

Jul. 20, 2021    (JP) .................................. 2021-119906

(51) Int. Cl.
*B60T 7/22* (2006.01)
*B60T 8/171* (2006.01)

(52) U.S. Cl.
CPC .............. *B60T 7/22* (2013.01); *B60T 8/171* (2013.01); *B60T 2201/03* (2013.01); *B60T 2210/32* (2013.01)

(58) Field of Classification Search
CPC ........ B60T 8/17558; B60T 8/171; B60T 7/22; B60T 2201/022; B60T 2201/03; B60T 2210/32; B60W 2554/4026
See application file for complete search history.

(56) References Cited

U.S. PATENT DOCUMENTS

| 2014/0324330 | A1* | 10/2014 | Minemura | G08G 1/166 |
| | | | | 701/300 |
| 2015/0332114 | A1* | 11/2015 | Springer | H04N 7/183 |
| | | | | 348/148 |
| 2017/0057498 | A1* | 3/2017 | Katoh | B60W 30/09 |
| 2018/0114442 | A1* | 4/2018 | Minemura | B60R 21/013 |

(Continued)

FOREIGN PATENT DOCUMENTS

| JP | 2007272647 A | * 10/2007 |
| JP | 2019-028840 A | 2/2019 |

(Continued)

OTHER PUBLICATIONS

Office Action issued in the corresponding Japanese Patent Application No. 2021-119906 on Apr. 1, 20125, w/ English Translation.

*Primary Examiner* — Stephen Holwerda
(74) *Attorney, Agent, or Firm* — Rimon P.C.

(57) ABSTRACT

A driving assistance device recognizes traveling environment information on a vehicle, detects a moving object having a speed component from an outside of a traveling road of the vehicle to an inside of the traveling road, determines whether the moving object will collide with the vehicle based on movement information of the vehicle and the moving object, performs execution of emergency braking if a physical quantity indicating a correlation between the vehicle and the moving object is equal to or smaller than a preset threshold, and cancels the execution of the emergency braking if the physical quantity is equal to or smaller than the threshold and a structure that blocks entry of the moving object into the traveling road is present on a movement path of the moving object.

5 Claims, 15 Drawing Sheets

(56) References Cited

U.S. PATENT DOCUMENTS

| | | | |
|---|---|---|---|
| 2018/0178783 A1* | 6/2018 | Saiki | B60W 30/09 |
| 2019/0042862 A1 | 2/2019 | Itamochi | |
| 2019/0073907 A1* | 3/2019 | Takaki | B60W 30/0956 |
| 2019/0108753 A1* | 4/2019 | Kaiser | G08G 1/0141 |
| 2019/0122037 A1* | 4/2019 | Russell | G06V 40/103 |
| 2019/0283741 A1 | 9/2019 | Toda et al. | |
| 2020/0279487 A1 | 9/2020 | Toda et al. | |
| 2022/0169245 A1* | 6/2022 | Hieida | G08G 1/162 |

FOREIGN PATENT DOCUMENTS

| | | |
|---|---|---|
| JP | 2019-156270 A | 9/2019 |
| WO | 2019/058446 A1 | 3/2019 |
| WO | WO-2020202741 A1 * 10/2020 | ........ B60W 30/0956 |

* cited by examiner

DRIVING ASSISTANCE DEVICE FOR VEHICLE

CROSS-REFERENCE TO RELATED APPLICATIONS

The present application claims priority from Japanese Patent Application No. 2021-119906 filed on Jul. 20, 2021, the entire contents of which are hereby incorporated by reference.

BACKGROUND

The disclosure relates to a driving assistance device that can perform collision avoidance braking control for a target vehicle against an obstacle having a possibility of colliding with the target vehicle.

In the field of vehicles such as automobiles, driving assistance devices that assist driving operations of drivers have been put into practical use to reduce loads on the driving operations of the drivers and improve safety. In this type of driving assistance device, various technologies have been developed for a driving assistance mode in which steering assistance control and acceleration/deceleration control are performed under the precondition that the driver voluntarily performs the driving operation, and a driving assistance mode in which the vehicle travels without the driving operation of the driver (so-called autonomous driving mode).

The driving assistance control in each driving assistance mode is basically achieved by an adaptive cruise control (ACC) function and an active lane keep centering (ALKC) function. With this driving assistance control, the vehicle can automatically travel along a traveling lane while keeping a distance from a preceding vehicle.

In the driving assistance device, the following technology is put into practical use. When an obstacle such as a vehicle or a pedestrian is recognized ahead of a target vehicle, autonomous emergency braking (AEB: collision damage reduction braking) control is performed against the obstacle as interrupt control to perform deceleration so that the relative speed between the target vehicle and the obstacle reaches zero.

There is a tendency that the emergency braking control is applied not only to an obstacle ahead of the target vehicle but extensively to a moving object entering a target vehicle traveling road from the outside of the target vehicle traveling road. For example, Japanese Unexamined Patent Application Publication No. 2019-156270 discloses the following technology. When determination is made that another vehicle is expected to enter the road from, for example, a shop located along the road, the target vehicle is decelerated or stopped to avoid collision with the other vehicle.

The emergency braking control may further be applied extensively to a moving object such as a pedestrian or a bicycle moving along, for example, a sidewalk outside the target vehicle traveling road.

SUMMARY

An aspect of the disclosure provides a driving assistance device for a vehicle. The driving assistance device includes a traveling environment recognizer, a moving object detector, a collision determiner, an emergency braking executor, and a canceler. The traveling environment recognizer is configured to recognize traveling environment information related to an outside of the vehicle. The moving object detector is configured to detect, based on the traveling environment information, a moving object having a speed component from an outside of a traveling road on which the vehicle is traveling to an inside of the traveling road. The collision determiner is configured to determine whether the moving object has a possibility of a collision with the vehicle, based on movement information of the target vehicle and movement information of the moving object. The emergency braking executor is configured to perform execution of emergency braking to avoid the collision in a case where a physical quantity indicating a correlation between the vehicle and the moving object having the possibility of the collision with the vehicle is equal to or smaller than a preset threshold. The canceler is configured to cancel the execution of the emergency braking in a case where the physical quantity is equal to or smaller than the threshold and a structure that blocks entry of the moving object into the traveling road is present on a movement path of the moving object.

An aspect of the disclosure provides a driving assistance device for a vehicle. The driving assistance device includes circuitry. The circuitry is configured to recognize traveling environment information related to an outside of the vehicle. The circuitry is configured to detect, based on the traveling environment information, a moving object having a speed component from an outside of a traveling road on which the vehicle is traveling to an inside of the traveling road. The circuitry is configured to determine whether the moving object has a possibility of colliding with the vehicle, based on movement information of the vehicle and movement information of the moving object. The circuitry is configured to perform execution of emergency braking to avoid the collision in a case where a physical quantity indicating a correlation between the target vehicle and the moving object having the possibility of the collision with the vehicle is equal to or smaller than a preset threshold. The circuitry is configured to cancel the execution of the emergency braking in a case where the physical quantity is equal to or smaller than the threshold and a structure that blocks entry of the moving object into the traveling road is present on a movement path of the moving object.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Unlike a vehicle such as an automobile, a moving object such as a pedestrian or a bicycle can stop or change the moving direction on a sidewalk or the like. Even if the moving object has a speed component toward a target vehicle traveling road, the moving object does not always enter the road. Therefore, if the emergency braking control is executed in response to every detection of an object moving along the sidewalk or the like with the speed component toward the target vehicle traveling road, unwanted emergency braking control may frequently be executed, resulting in occupant's discomfort.

It is desirable to provide a driving assistance device that can execute appropriate emergency braking control for a vehicle against an object moving outside a target vehicle traveling road without causing occupant's discomfort.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
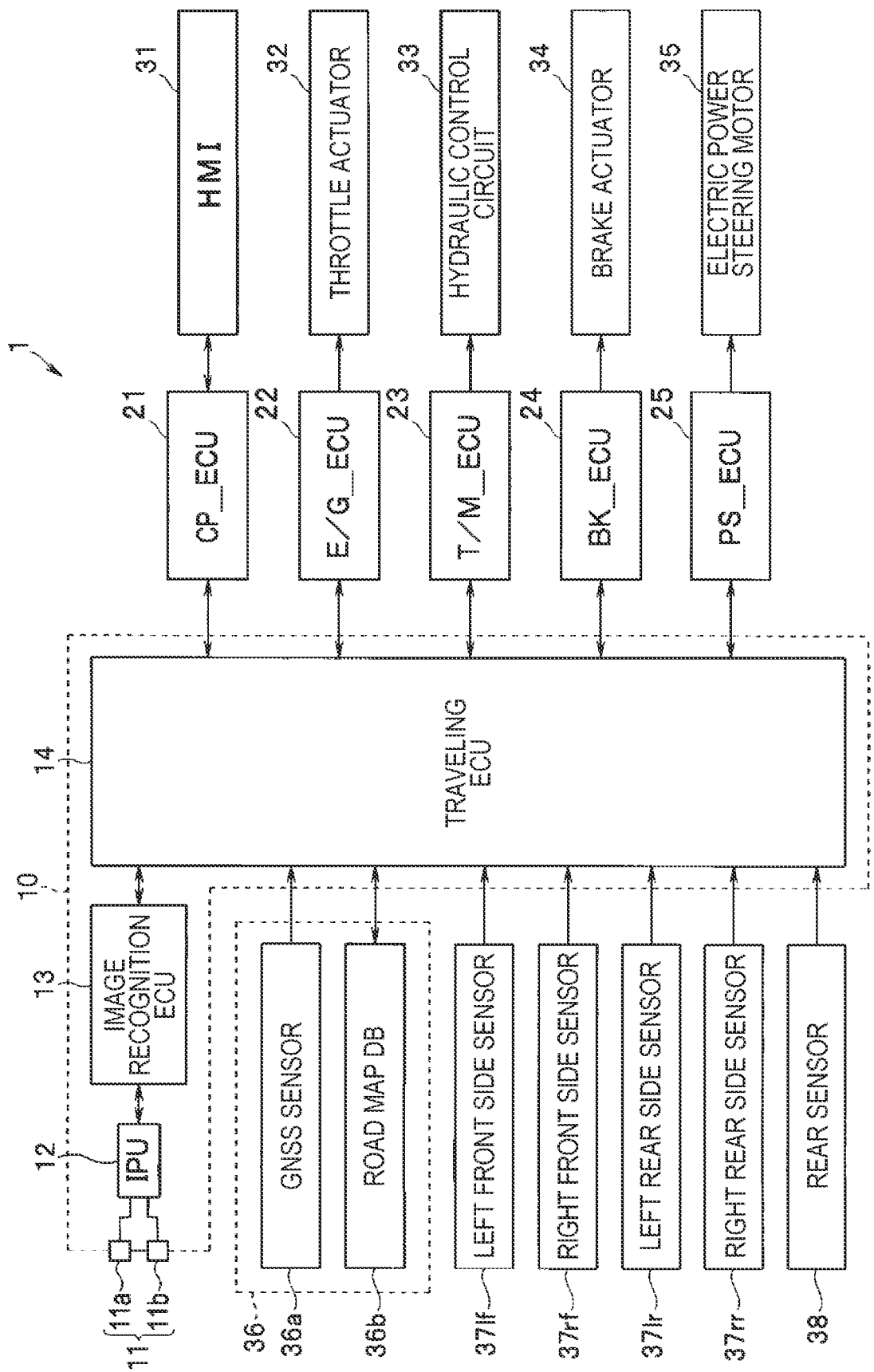
FIG. 1 is an overall configuration diagram of a driving assistance device.

FIG. 1 is an overall configuration diagram of a driving assistance device.

As illustrated in FIG. 1, a driving assistance device 1 includes, for example, a camera unit 10 fixed to an upper central part of a front area in a cabin of a vehicle (target vehicle) M.

The camera unit 10 includes a stereo camera 11, an image processing unit (IPU) 12, an image recognition unit (image recognition ECU) 13, and a traveling control unit (traveling ECU) 14.

Figure 2:
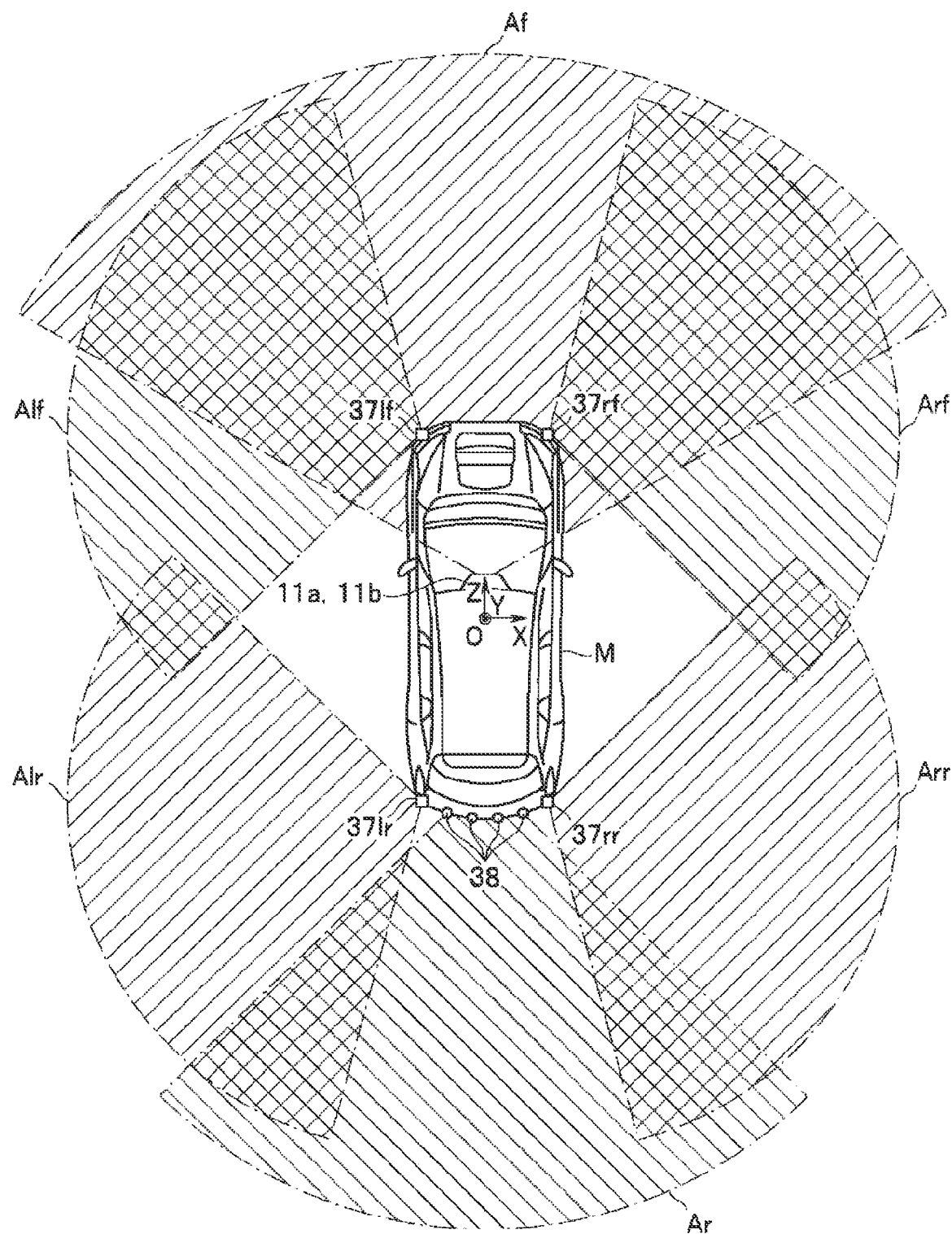
FIG. 2 is an explanatory diagram illustrating monitoring areas of a stereo camera, a radar, and a sonar.

The stereo camera 11 includes a main camera 11a and a subcamera 11b. For example, the main camera 11a and the subcamera 11b are bilaterally symmetrical across the center in a vehicle width direction. For example, the main camera 11a and the subcamera 11b each include a CMOS, and perform stereoscopic imaging for a traveling environment in an external forward area Af (see FIG. 2) from different viewpoints in every predetermined synchronous imaging period.

The IPU 12 performs predetermined image processing for traveling environment images captured by the stereo camera 11 to detect various target edges of, for example, three-dimensional objects and lane lines on a road surface in the images. The IPU 12 obtains distance information from positional deviation amounts of corresponding edges in the right and left images, and generates image information including the distance information (distance image information).

The image recognition ECU 13 obtains, based on the distance image information received from the IPU 12, a road curvature [1/m] between right and left lane lines of a road where the target vehicle M is traveling (target vehicle traveling road) and a width between the right and left lane lines (lane width). Various methods are known to obtain the road curvature and the lane width. For example, the image recognition ECU 13 obtains the road curvature in such a manner that right and left lane lines are recognized by binarization using a difference in brightness levels based on traveling environment information and the curvatures of the right and left lane lines are obtained for each predetermined section by using a curve approximation expression based on the least-square method. The image recognition ECU 13 calculates the lane width from a difference in the curvatures of the right and left lane lines.

The image recognition ECU 13 calculates, based on the curvatures of the right and left lane lines and the lane width, a lane center and a target-vehicle lateral positional deviation that is a distance from the lane center to the center of the target vehicle M in the vehicle width direction.

The image recognition ECU 13 performs predetermined pattern matching for the distance image information to recognize three-dimensional objects such as guardrails along the road, curbstones, and surrounding vehicles. In the recognition of three-dimensional objects, the image recognition ECU 13 recognizes, for example, types of the three-dimensional objects, heights of the three-dimensional objects, distances from the three-dimensional objects, speeds of the three-dimensional objects, and relative speeds between the three-dimensional objects and the target vehicle M.

Various types of information recognized by the image recognition ECU 13 are output to the traveling ECU 14 as traveling environment information.

The image recognition ECU 13 recognizes traveling environment information related to the outside of the vehicle in cooperation with the stereo camera 11 and the IPU 12. In one embodiment, the image recognition ECU 13 may serve as a "traveling environment recognizer".

The traveling ECU 14 is a control unit that centrally controls the driving assistance device 1.

Various control units such as a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are coupled to the traveling ECU 14 via an internal communication network such as a controller area network (CAN).

Various sensors such as a locator unit 36, a right front side sensor 37rf, a left front side sensor 37lf, a right rear side sensor 37rr, a left rear side sensor 37lr, and a rear sensor 38 are coupled to the traveling ECU 14.

A human-machine interface (HMI) 31 disposed near a driver's seat is coupled to the CP_ECU 21. For example, the HMI 31 includes a switch for giving instructions to execute various types of driving assistance control, a mode selection switch for switching driving assistance modes, a steering touch sensor that detects a steering wheel holding state of a driver, a driver monitoring system (DMS) that performs facial authentication of the driver and detects a line of sight, a touch panel display, a combination of meters, and a loudspeaker.

In response to a control signal from the traveling ECU 14, the CP_ECU 21 notifies the driver as appropriate by display and sound through the HMI 31 about various types of information related to, for example, various alerts for a preceding vehicle, the status of the driving assistance control, and the traveling environment of the target vehicle M. The CP_ECU 21 outputs, to the traveling ECU 14, various types of information input by the driver through the HMI 31, such as ON/OFF operations on various types of driving assistance control.

For example, a throttle actuator 32 of an electronically controlled throttle is coupled to an output side of the E/G_ECU 22. Various sensors such as an accelerator sensor (not illustrated) are coupled to an input side of the E/G_ECU 22.

The E/G_ECU 22 controls drive of the throttle actuator 32 based on, for example, either one of a control signal from the traveling ECU 14 and detection signals from various sensors. Thus, the E/G_ECU 22 adjusts the intake amount of an engine to generate desired engine power. The E/G_ECU 22 outputs, to the traveling ECU 14, signals of an accelerator operation amount and the like detected by various sensors.

A hydraulic control circuit 33 is coupled to an output side of the T/M_ECU 23. Various sensors such as a shift position sensor (not illustrated) are coupled to an input side of the T/M_ECU 23. The T/M_ECU 23 performs hydraulic control for the hydraulic control circuit 33 based on, for example, a signal of an engine torque estimated by the E/G_ECU 22 and detection signals from various sensors. Thus, the T/M_ECU 23 changes the engine power at a desired speed ratio by operating, for example, friction engagement elements and pulleys in an automatic transmission. The T/M_ECU 23 outputs, to the traveling ECU 14, signals of a shift position and the like detected by various sensors.

A brake actuator 34 for adjusting brake fluid pressures to be output to brake wheel cylinders in individual wheels is coupled to an output side of the BK_ECU 24. Various sensors such as a brake pedal sensor, a yaw rate sensor, a longitudinal acceleration sensor, and a vehicle speed sensor (not illustrated) are coupled to an input side of the BK_ECU 24.

The BK_ECU 24 controls drive of the brake actuator 34 based on either one of a control signal from the traveling ECU 14 and detection signals from various sensors. Thus, the BK_ECU 24 generates, for the wheels as appropriate, braking forces for forcible braking control and yaw rate control on the target vehicle M. The BK_ECU 24 outputs, to the traveling ECU 14, signals of a brake operation status, a yaw rate, a longitudinal acceleration, a vehicle speed (target vehicle speed), and the like detected by various sensors.

An electric power steering motor 35 for applying a steering torque of a rotational force from a motor to a steering mechanism is coupled to an output side of the PS_ECU 25. Various sensors such as a steering torque sensor and a steering angle sensor are coupled to an input side of the PS_ECU 25.

The PS_ECU 25 controls drive of the electric power steering motor 35 based on either one of a control signal from the traveling ECU 14 and detection signals from various sensors. Thus, the PS_ECU 25 generates the steering torque for the steering mechanism. The PS_ECU 25 outputs, to the traveling ECU 14, signals of a steering torque, a steering angle, and the like detected by various sensors.

The locator unit 36 includes a GNSS sensor 36a and a high-accuracy road map database (road map DB) 36b.

The GNSS sensor 36a measures the position (latitude, longitude, and altitude) of the target vehicle M by receiving positioning signals from a plurality of positioning satellites.

The road map DB 36b is a large-capacity storage medium such as an HDD, and stores high-accuracy road map information (dynamic map). For example, the road map DB 36b stores lane width data, lane center position coordinate data, lane azimuth angle data, and speed limits as lane data for use in autonomous driving. The stored lane data includes pieces of data for several-meter intervals in each lane on the road map. The road map DB stores information on various facilities and parking lots. Based on, for example, a request signal from the traveling ECU 14, the road map DB 36b outputs road map information in a set range around the target vehicle position measured by the GNSS sensor 36a to the traveling ECU 14 as traveling environment information.

The road map DB 36b recognizes traveling environment information related to the outside of the vehicle in cooperation with the GNSS sensor 36a. In one embodiment, the road map DB 36b may serve as a "traveling environment recognizer".

Examples of the right front side sensor 37rf and the left front side sensor 37lf include millimeter wave radars. For example, the right front side sensor 37rf and the left front side sensor 37lf are disposed on right and left sides of a front bumper. The right front side sensor 37rf and the left front side sensor 37lf detect, as traveling environment information, three-dimensional objects in right and left obliquely forward and side areas Arf and Alf around the target vehicle M (see FIG. 2). Those areas are difficult to recognize from an image captured by the stereo camera 11.

Examples of the right rear side sensor 37rr and the left rear side sensor 37lr include millimeter wave radars. For example, the right rear side sensor 37rr and the left rear side sensor 37lr are disposed on right and left sides of a rear bumper. The right rear side sensor 37rr and the left rear side sensor 37lr detect, as traveling environment information, three-dimensional objects in right and left obliquely rearward and side areas Arr and Alr around the target vehicle M (see FIG. 2). Those areas are difficult to recognize by the right front side sensor 37rf and the left front side sensor 37lf.

Each millimeter wave radar detects the three-dimensional object such as a vehicle traveling side by side by outputting a radio wave and analyzing the reflected wave from the object. For example, each radar detects a width of the three-dimensional object, a position of a representative point of the three-dimensional object (position relative to the target vehicle M), and a speed of the three-dimensional object as information related to the three-dimensional object.

The right front side sensor 37*rf*, the left front side sensor 371*f*, the right rear side sensor 37*rr*, and the left rear side sensor 371*r* recognize traveling environment information related to the outside of the vehicle. In one embodiment, the right front side sensor 37*rf*, the left front side sensor 371*f*, the right rear side sensor 37*rr*, and the left rear side sensor 371*r* may serve as a "traveling environment recognizer".

Examples of the rear sensor 38 include a sonar. For example, the rear sensor 38 is disposed on the rear bumper. The rear sensor 38 detects three-dimensional objects in a rearward area Ar behind the target vehicle M (see FIG. 2) as traveling environment information. This area is difficult to recognize by the right rear side sensor 37*rr* and the left rear side sensor 371*r*.

The rear sensor 38 recognizes traveling environment information related to the outside of the vehicle. In one embodiment, the rear sensor 38 may serve as the traveling environment recognizer configured Coordinates of the external targets in the traveling environment information recognized by the image recognition ECU 13, the traveling environment information recognized by the locator unit 36, the traveling environment information recognized by the right front side sensor 37*rf*, the traveling environment information recognized by the left front side sensor 371*f*, the traveling environment information recognized by the right rear side sensor 37*rr*, the traveling environment information recognized by the left rear side sensor 371*f*, and the traveling environment information recognized by the rear sensor 38 are converted by the traveling ECU 14 into coordinates in a three-dimensional coordinate system having its origin at the center of the target vehicle M (see FIG. 2).

The traveling ECU 14 has driving modes such as a manual driving mode, a first traveling control mode, a second traveling control mode, and a limp home mode. The traveling ECU 14 can selectively switch the driving modes based on, for example, a status of operation on the mode selection switch of the HMI 31.

The manual driving mode is a driving mode in which the driver is assumed to hold the steering wheel. In this driving mode, the target vehicle M travels by driving operations of the driver, such as a steering operation, an accelerator operation, and a brake operation.

The first traveling control mode is also a driving mode in which the driver is assumed to hold the steering wheel. That is, the first traveling control mode is a so-called semi-autonomous driving mode in which the target vehicle M travels along a target traveling route by combining, for example, adaptive cruise control (ACC), active lane keep centering (ALKC) control, and active lane keep bouncing control as appropriate through control of, for example, the E/G_ECU 22, the BK_ECU 24, and the PS_ECU 25 while reflecting the driving operations of the driver.

The adaptive cruise control is basically performed based on traveling environment information input from the image recognition ECU 13. For example, the adaptive cruise control is performed based on preceding vehicle information in the traveling environment information from the image recognition ECU 13.

The active lane keep centering control and the active lane keep bouncing control are basically performed based on traveling environment information input from at least one of the image recognition ECU 13 or the locator unit 36. For example, the active lane keep centering control and the active lane keep bouncing control are performed based on lane line information in the traveling environment information from either one of the image recognition ECU 13 and the locator unit 36.

The second traveling control mode is an autonomous driving mode in which the target vehicle M travels along a target route (route map information) by combining, for example, the adaptive cruise control, the active lane keep centering control, and the active lane keep bouncing control as appropriate through control of, for example, the E/G_ECU 22, the BK_ECU 24, and the PS_ECU without the steering wheel holding by the driver, the accelerator operation, and the brake operation.

In the limp home mode, the target vehicle M is automatically stopped, for example, at a side strip when the target vehicle M traveling in the second traveling control mode cannot continue the traveling in this mode and the driver cannot take over the driving operation (that is, the mode cannot be switched to either one of the manual driving mode and the first traveling control mode).

In each of the driving modes described above, the traveling ECU 14 performs autonomous emergency braking (AEB: collision damage reduction braking) control as appropriate against an obstacle such as a preceding vehicle traveling on the target vehicle traveling road and having a strong possibility of colliding with the target vehicle M.

When determination is made that there is difficulty in avoiding collision with the obstacle by the emergency braking control, the traveling ECU 14 may perform emergency steering control for avoiding the collision with the obstacle in place of or in combination with the emergency braking control.

The emergency braking control and the emergency steering control are basically performed based on traveling environment information input from the image recognition ECU 13. For example, the emergency braking control and the emergency steering control are performed based on information on an obstacle such as a preceding vehicle or a stopped vehicle in the traveling environment information from the image recognition ECU 13. To avoid collision with, for example, either one of a vehicle traveling side by side and a succeeding vehicle, reference is made to information on the succeeding vehicle and information on the vehicle traveling side by side in the pieces of traveling environment information from the right and left front side sensors 37*rf* and 371*f*, the right and left rear side sensors 37*rr* and 371*r*, and the rear sensor 38.

In this embodiment, the traveling ECU 14 executes the emergency braking control with its control target applied not only to an obstacle originally inside the target vehicle traveling road but extensively to an obstacle entering the target vehicle traveling road from the outside of the target vehicle traveling road (moving object).

That is, at the time of the emergency braking control, the traveling ECU 14 detects three-dimensional objects such as a preceding vehicle or a stopped vehicle inside the target vehicle traveling road, and three-dimensional objects outside the target vehicle traveling road.

The traveling ECU 14 determines whether each three-dimensional object inside the target vehicle traveling road has a possibility of colliding with the target vehicle M based on movement information of the target vehicle M and movement information of the three-dimensional object.

The traveling ECU 14 determines whether each three-dimensional object detected outside the target vehicle traveling road is a moving object having a speed component Vsx toward the target vehicle traveling road. The traveling ECU 14 determines whether each moving object having the speed component Vsx has a possibility of colliding with the target vehicle M based on the movement information of the target vehicle M and movement information of the three-dimensional object (moving object).

The traveling ECU 14 extracts, as a control target for the emergency braking control, the three-dimensional object having a possibility of colliding with the target vehicle M earliest among the three-dimensional objects detected inside and outside the target vehicle traveling road and having a strong possibility of colliding with the target vehicle M.

When the control target is extracted, the traveling ECU 14 calculates a time-to-collision TTC (=(relative speed between target vehicle M and obstacle in fore-and-aft direction of target vehicle M)/(relative distance to obstacle in fore-and-aft direction of target vehicle M)) as a physical quantity to the control target, and alerts the driver to call attention when the time-to-collision TTC is equal to or shorter than a preset first threshold TTCth1.

When the time-to-collision TTC with the control target is equal to or shorter than a preset second threshold TTCth2, the traveling ECU 14 executes emergency braking to avoid collision with the control target through the BK_ECU 24.

When executing the emergency braking, the traveling ECU 14 determines whether to cancel the execution of the emergency braking in a case where the control target is a moving object from the outside of the target vehicle traveling road. The condition for the cancellation determination includes a condition as to whether a structure such as a guardrail or a curbstone that blocks entry of the moving object into the target vehicle traveling road is present on a movement path of the moving object. The traveling ECU 14 cancels the execution of the emergency braking when the cancellation condition is satisfied.

In one embodiment, the traveling ECU 14 may serve as a "moving object detector", a "collision determiner", an "emergency braking executor", and a "canceler".

Next, the emergency braking control to be executed by the traveling ECU 14 is described with reference to a flowchart of an emergency braking control routine in FIG. 3. This routine is repeated at every set time.

When the routine is started, the traveling ECU 14 reads traveling environment information in Step S101. The traveling environment information includes various types of information related to three-dimensional objects such as a preceding vehicle or a stopped vehicle inside the target vehicle traveling road, three-dimensional objects such as a pedestrian or a bicycle on a sidewalk or the like outside the target vehicle traveling road, and structures such as a guardrail or a curbstone between the target vehicle traveling road and the sidewalk or the like.

Figure 4:
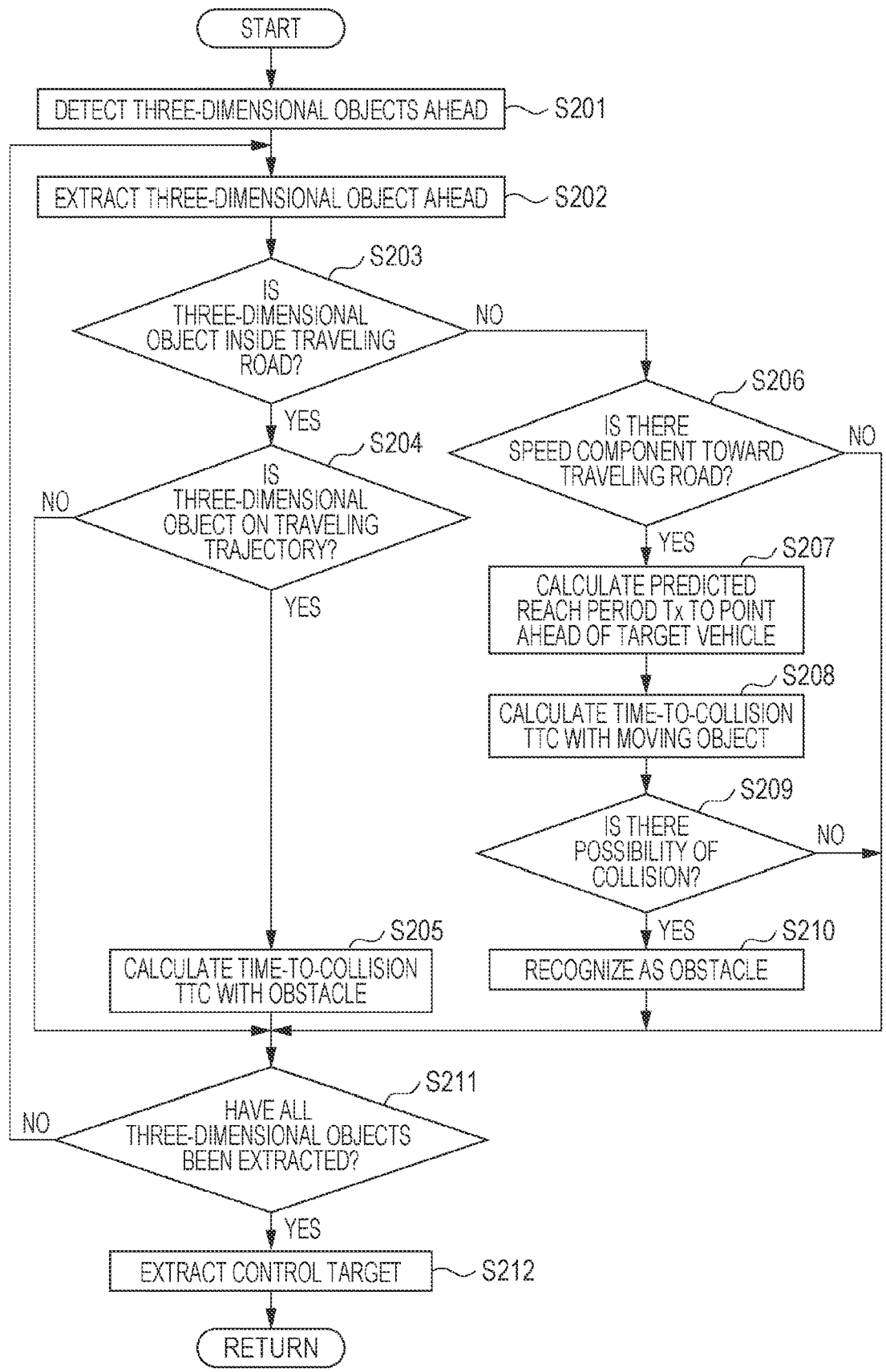
FIG. 4 is a flowchart illustrating a control target setting subroutine.

In Step S102, the traveling ECU 14 sets a control target for the emergency braking control. For example, the control target is set based on a control target setting subroutine illustrated in FIG. 4.

When the subroutine is started, the traveling ECU 14 detects, in Step S201, three-dimensional objects ahead of the target vehicle M based on the traveling environment information. That is, the traveling ECU 14 detects three-dimensional objects such as a preceding vehicle or a parked vehicle ahead of the target vehicle M inside the target vehicle traveling road, and three-dimensional objects such as a pedestrian or a bicycle ahead of the target vehicle M on the sidewalk or the like outside the target vehicle traveling road.

In Step S202, the traveling ECU 14 extracts one three-dimensional object from the three-dimensional objects detected in Step S201.

In Step S203, the traveling ECU 14 checks whether the currently extracted three-dimensional object is inside the target vehicle traveling road.

When determination is made in Step S203 that the extracted three-dimensional object is inside the target vehicle traveling road, the traveling ECU 14 proceeds to Step S204 to check whether the extracted three-dimensional object is on a traveling trajectory of the target vehicle M, that is, whether the extracted three-dimensional object may be an obstacle on a predicted path of the target vehicle M.

When determination is made in Step S204 that the extracted three-dimensional object is not on the traveling trajectory of the target vehicle M, the traveling ECU 14 proceeds to Step S211.

When determination is made in Step S204 that the extracted three-dimensional object is on the traveling trajectory of the target vehicle M, the traveling ECU 14 recognizes that the extracted three-dimensional object is an obstacle on the predicted path of the target vehicle M, and proceeds to Step S205 to calculate a time-to-collision TTC with the obstacle. Then, the traveling ECU 14 proceeds to Step S211.

When determination is made in Step S203 that the currently extracted three-dimensional object is outside the target vehicle traveling road, the traveling ECU 14 proceeds to Step S206 to check whether the extracted three-dimensional object has a speed component toward the target vehicle traveling road. That is, the traveling ECU 14 checks whether the extracted three-dimensional object has a speed component Vsx in a lateral direction (X-axis direction in FIG. 2) intersecting a speed vector Vm of the target vehicle M (see, for example, FIG. 7).

When determination is made in Step S206 that the extracted three-dimensional object does not have the speed component Vsx in the lateral direction intersecting the speed vector Vm of the target vehicle M, the traveling ECU 14 proceeds to Step S211 without recognizing the three-dimensional object as the obstacle.

Figure 7:
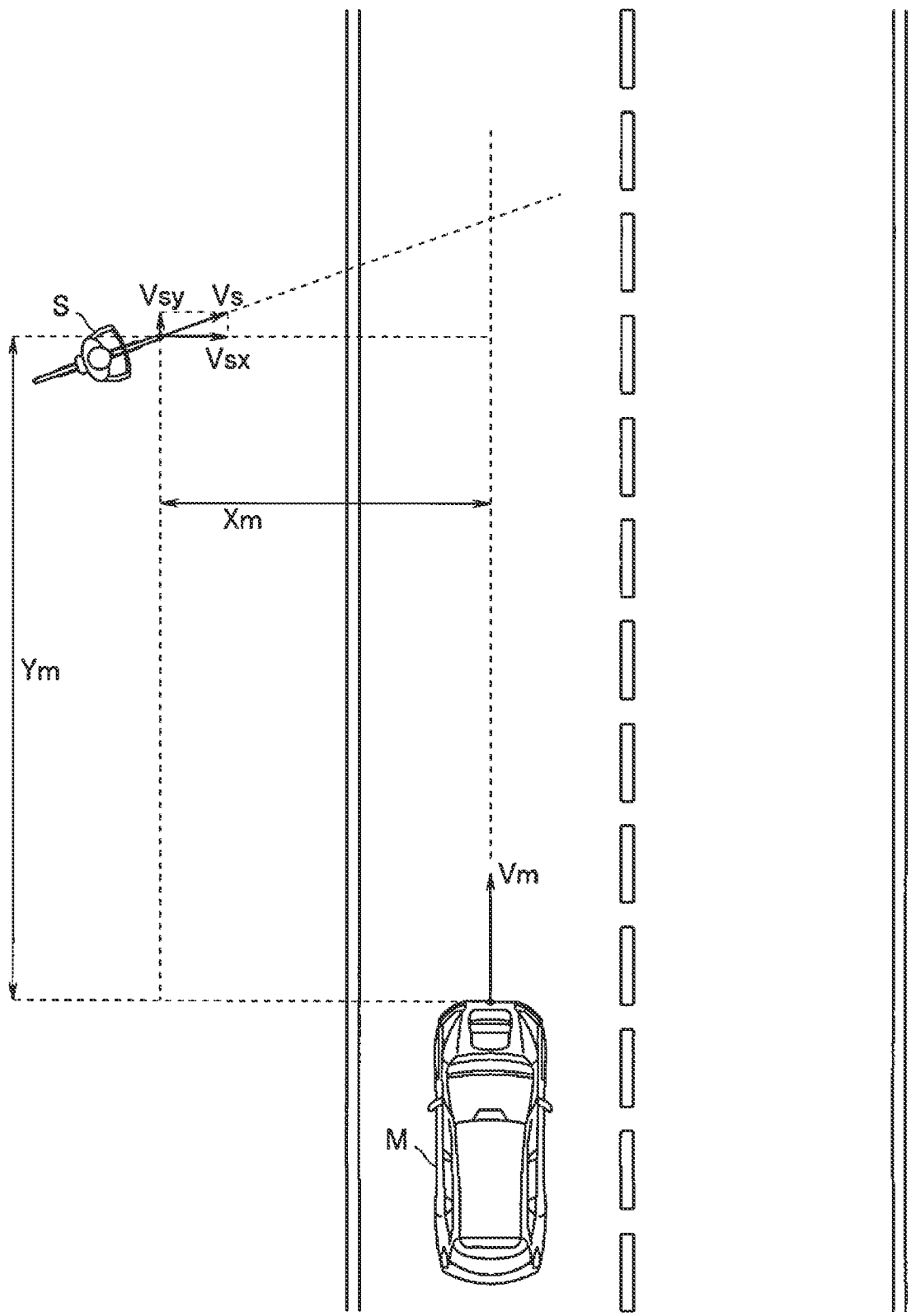
FIG. 7 is an explanatory diagram illustrating a correlation between a target vehicle and a moving object.

When determination is made in Step S206 that the extracted three-dimensional object is a moving object S having the speed component Vsx in the lateral direction intersecting the speed vector Vm of the target vehicle M (see, for example, FIG. 7), the traveling ECU 14 proceeds to Step S207 to calculate a predicted reach period Tx of the moving object to a point ahead of the target vehicle M. For example, as illustrated in FIG. 7, Xm represents a relative distance between the target vehicle M and the moving object S in the vehicle width direction (X-axis direction) of the target vehicle M. Then, the predicted reach period Tx is calculated by dividing the relative distance Xm by the speed component Vsx in the lateral direction.

In Step S208, the traveling ECU 14 calculates a time-to-collision TTC with the moving object S (=Vrel/Ym) based on a relative speed Vrel between the target vehicle M and the moving object S in the fore-and-aft direction (Y-axis direction in FIG. 2) of the target vehicle M and a relative distance Ym between the target vehicle M and the moving object S in the fore-and-aft direction of the target vehicle M.

In Step S209, the traveling ECU 14 checks whether the moving object S has a possibility of colliding with the target vehicle M. For example, whether the moving object S has the possibility of colliding with the target vehicle M is determined by checking whether the predicted reach period Tx and the time-to-collision TTC satisfy a relationship of "TTC−α<Tx<TTC+α". For example, "α" is a constant preset based on the width of the target vehicle M, the target vehicle speed Vm, and the speed component Vsx.

When determination is made in Step S209 that the moving object S does not have the possibility of colliding with the target vehicle M, the traveling ECU 14 proceeds to Step S211 without recognizing the moving object S as the obstacle.

When determination is made in Step S209 that the moving object S has the possibility of colliding with the target vehicle M, that is, the relationship of "TTC−α<Tx<TTC+α" is satisfied, the traveling ECU 14 proceeds to Step S210 to recognize the moving object S as the obstacle, and then proceeds to Step S211.

In Step S211 from Step S204, S205, S206, or S210, the traveling ECU 14 checks whether all the three-dimensional objects currently detected ahead have been extracted in Step S202.

When determination is made in Step S211 that all the three-dimensional objects ahead have not been extracted, the traveling ECU 14 returns to Step S202.

When determination is made in Step S211 that all the three-dimensional objects ahead have been extracted, the traveling ECU 14 proceeds to Step S212 to extract, as the control target for the emergency braking control, the three-dimensional object having the shortest time-to-collision TTC among the three-dimensional objects recognized as the obstacles, and then terminates the subroutine. When no three-dimensional object is recognized as the obstacle, the traveling ECU 14 terminates the subroutine without extracting the three-dimensional object as the control target for the emergency braking control.

Through the control target setting subroutine of this embodiment, not only the three-dimensional object inside the target vehicle traveling road but also the three-dimensional object outside the target vehicle traveling road may be set as the control target for the emergency braking control.

Figure 3:
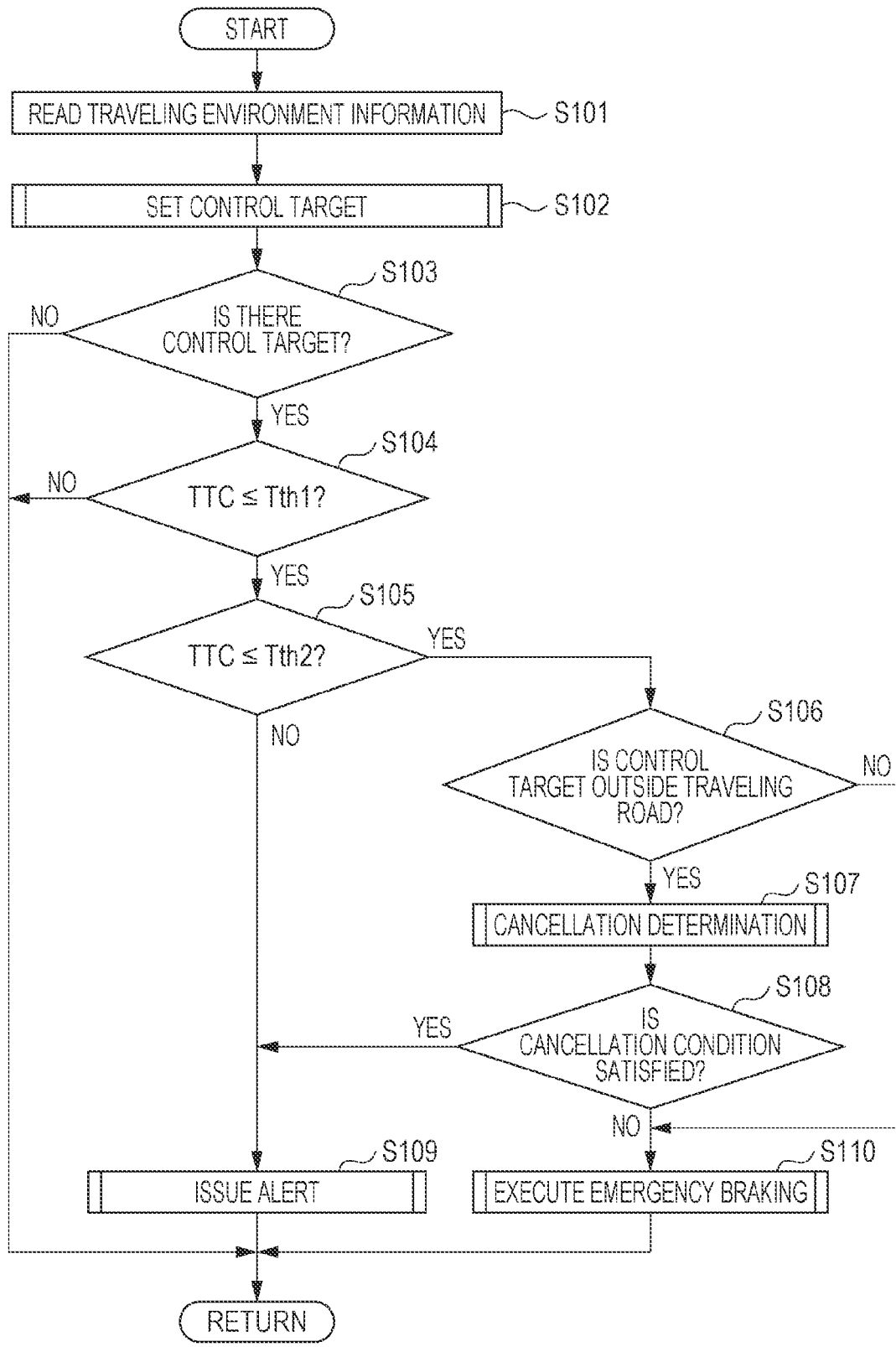
FIG. 3 is a flowchart illustrating an emergency braking control routine.

In the main routine of FIG. 3, the traveling ECU 14 checks in Step S103 from Step S102 whether the control target for the emergency braking control is currently present ahead of the target vehicle M.

When determination is made in Step S103 that the control target is not present, the traveling ECU 14 terminates the routine.

When determination is made in Step S103 that the control target is present, the traveling ECU 14 proceeds to Step S104 to check whether the time-to-collision TTC with the control target is equal to or shorter than a preset first threshold Tth1.

When determination is made in Step S104 that the time-to-collision TTC is longer than the first threshold Tth1, the traveling ECU 14 terminates the routine.

When determination is made in Step S104 that the time-to-collision TTC is equal to or shorter than the first threshold Tth1, the traveling ECU 14 proceeds to Step S105 to check whether the time-to-collision TTC is equal to or shorter than a preset second threshold Tth2 (Tth2<Tth1).

When determination is made in Step S105 that the time-to-collision TTC is longer than the second threshold Tth2, the traveling ECU 14 proceeds to Step S109.

When determination is made in Step S105 that the time-to-collision TTC is equal to or shorter than the second threshold Tth2, the traveling ECU 14 proceeds to Step S106 to check whether the currently set control target is a moving object outside the target vehicle traveling road.

When determination is made in Step S106 that the control target is a three-dimensional object inside the target vehicle traveling road, the traveling ECU 14 proceeds to Step S110.

Figure 5:
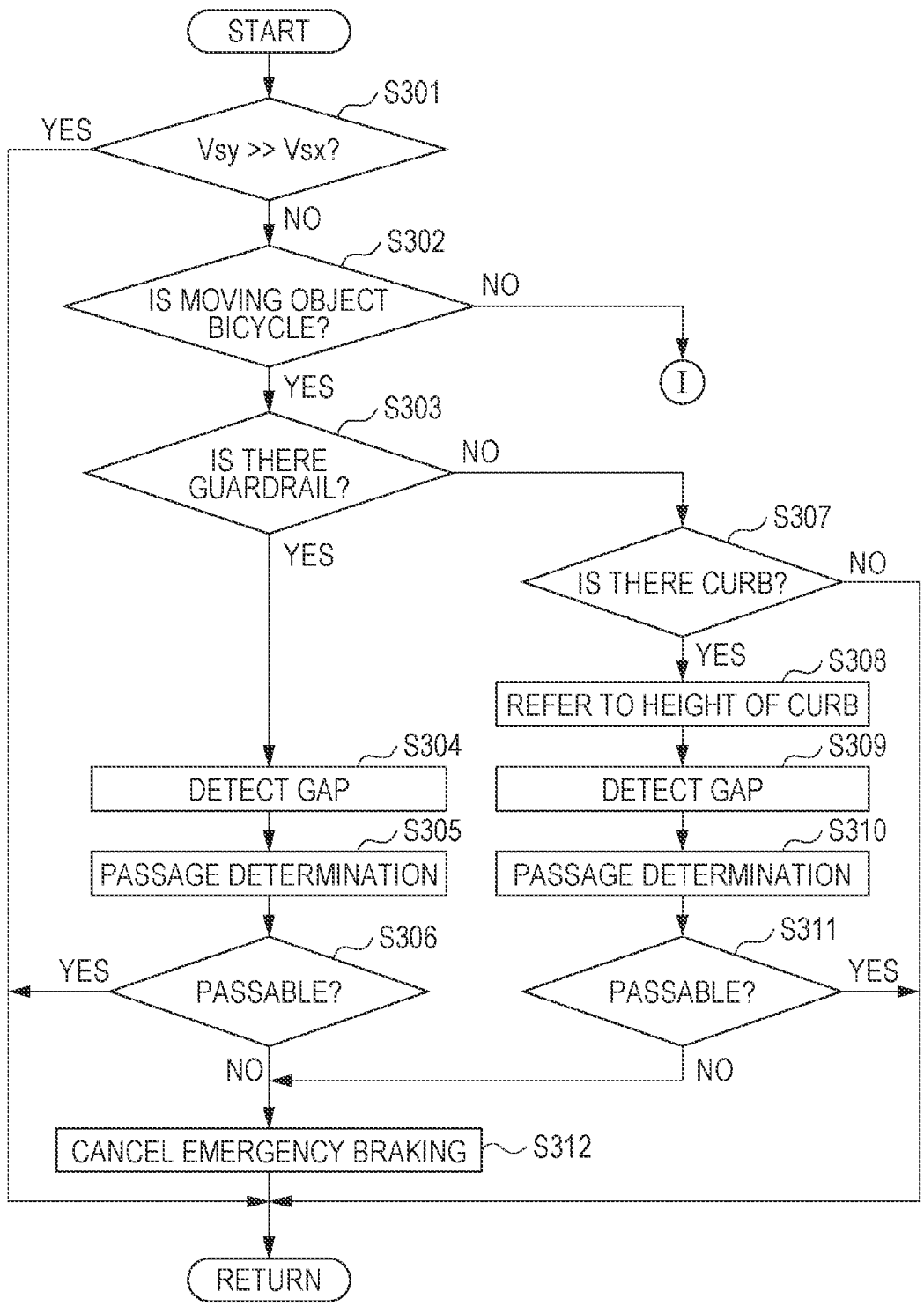
FIG. 5 is a flowchart illustrating a cancellation determination subroutine (Part 1)
Figure 6:
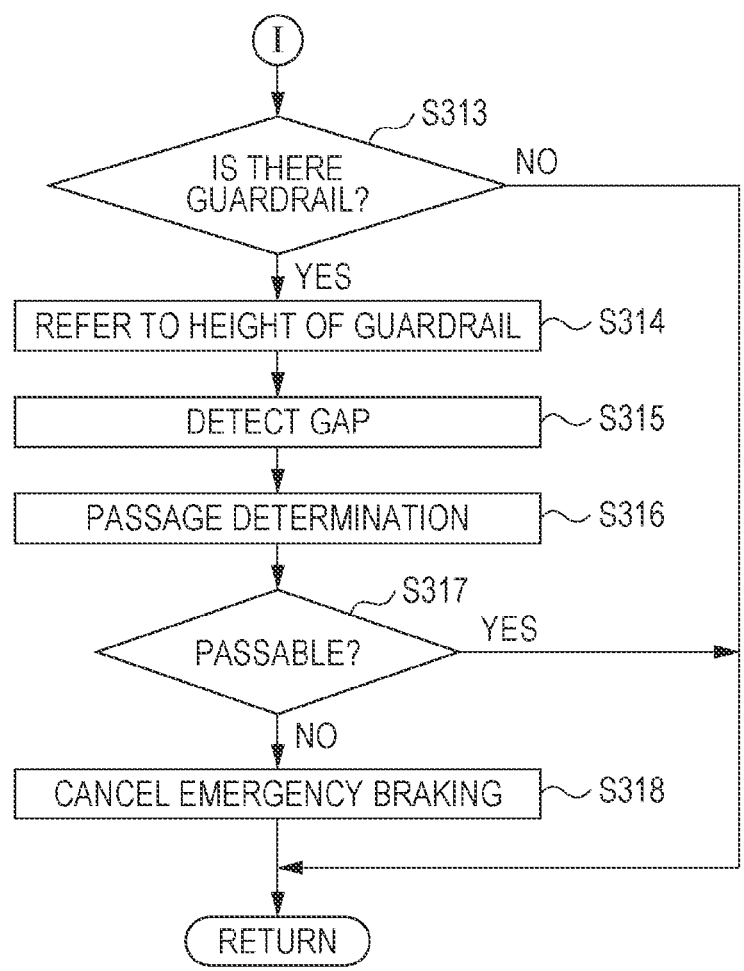
FIG. 6 is a flowchart illustrating the cancellation determination subroutine (Part 2)

When determination is made in Step S106 that the control target is the moving object S outside the target vehicle traveling road, the traveling ECU 14 proceeds to Step S107 to execute cancellation determination on the emergency braking. For example, the cancellation determination is executed with reference to a flowchart of a cancellation determination subroutine in FIGS. 5 and 6.

When the subroutine is started, the traveling ECU 14 checks in Step S301 whether a speed component Vsy of the moving object S in the fore-and-aft direction of the target vehicle M is sufficiently larger than the speed component Vsx of the moving object S in the vehicle width direction of the target vehicle M. For example, the traveling ECU 14 checks whether the speed component Vsy is larger than a value obtained by multiplying the speed component Vsx by a coefficient β (β is a coefficient larger than "1"). That is, the traveling ECU 14 checks, based on the speed components of the moving object S, whether the moving object S intends to move on the sidewalk or the like along the target vehicle traveling road, or intends to enter the target vehicle traveling road.

Figure 8:
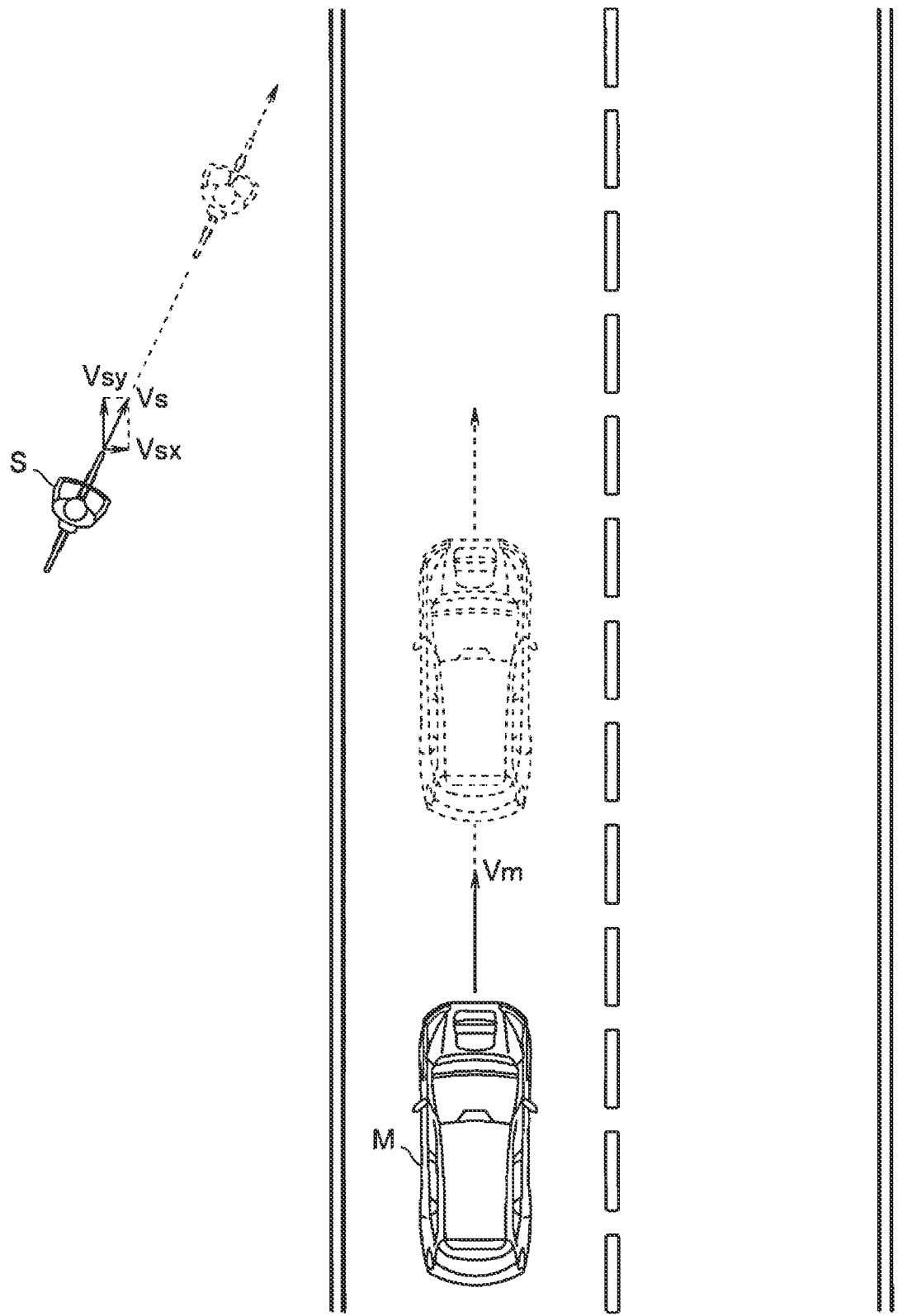
FIG. 8 is an explanatory diagram illustrating a case where determination is made that there is a small possibility of entry of a bicycle into a target vehicle traveling road based on speed components of the bicycle.

When determination is made in Step S301 that the speed component Vsy of the moving object S is sufficiently larger than the speed component Vsx (see, for example, FIG. 8), the traveling ECU 14 terminates the subroutine.

Figure 9:
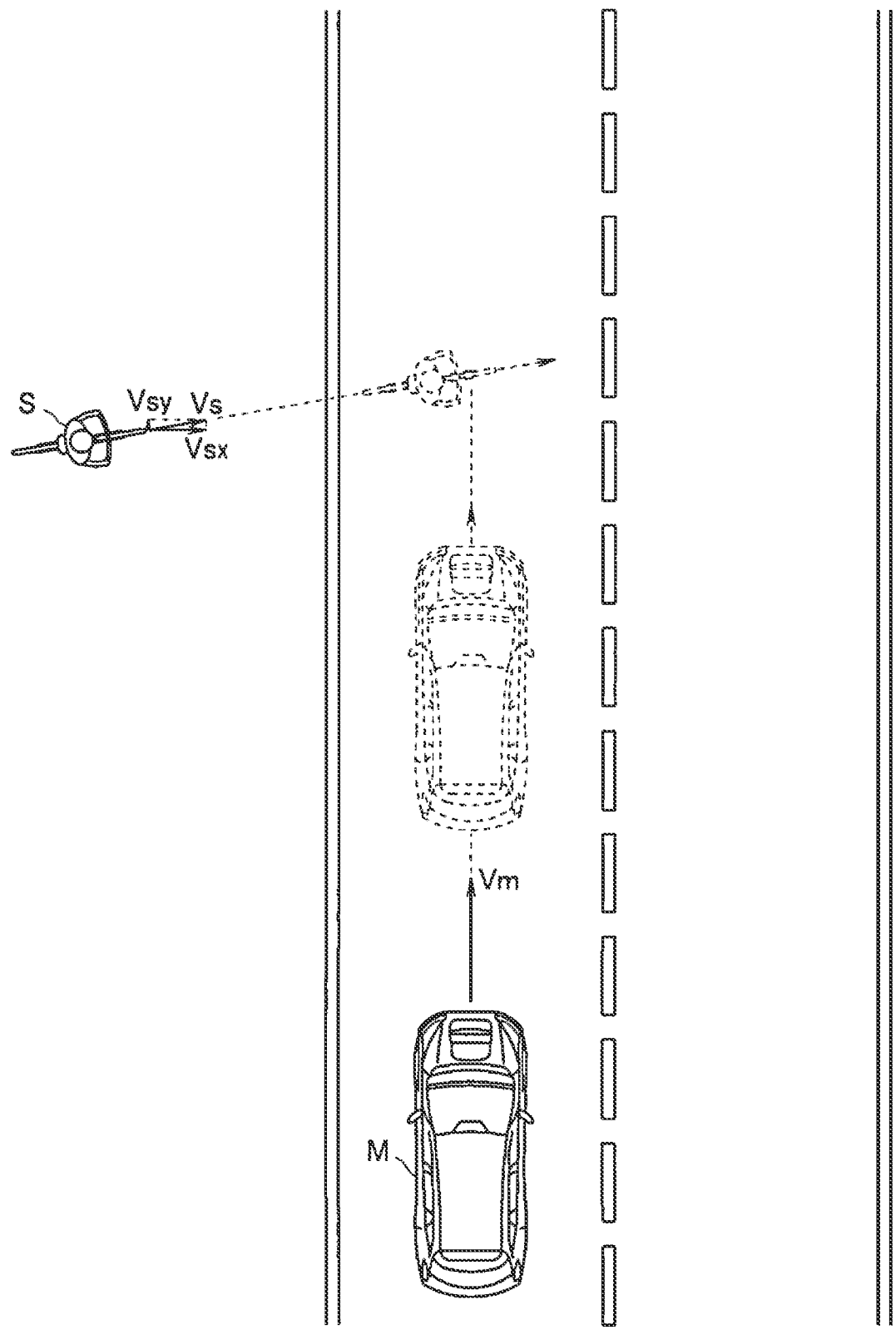
FIG. 9 is an explanatory diagram illustrating a case where determination is made that there is a strong possibility of entry of the bicycle into the target vehicle traveling road based on the speed components of the bicycle.

When determination is made in Step S301 that the speed component Vsy of the moving object S is sufficiently smaller than the speed component Vsx (see, for example, FIG. 9), the traveling ECU 14 proceeds to Step S302 to check whether the moving object S is a bicycle.

When determination is made in Step S302 that the moving object S is not the bicycle, that is, the moving object S is a pedestrian, the traveling ECU 14 proceeds to Step S313.

When determination is made in Step S302 that the moving object S is the bicycle, the traveling ECU 14 proceeds to Step S303 to check whether a guardrail G defining the inside and outside of the target vehicle traveling road is present in the moving direction of the moving object S (bicycle).

When determination is made in Step S303 that the guardrail G is not present in the moving direction of the moving object S (bicycle), the traveling ECU 14 proceeds to Step S307.

When determination is made in Step S303 that the guardrail G is present in the moving direction of the moving object S (bicycle), the traveling ECU 14 proceeds to Step S304 to detect a gap in the guardrail G (a break in the guardrail G). That is, the traveling ECU 14 checks whether the guardrail G has a gap where the moving object S (bicycle) is passable.

Figure 10:
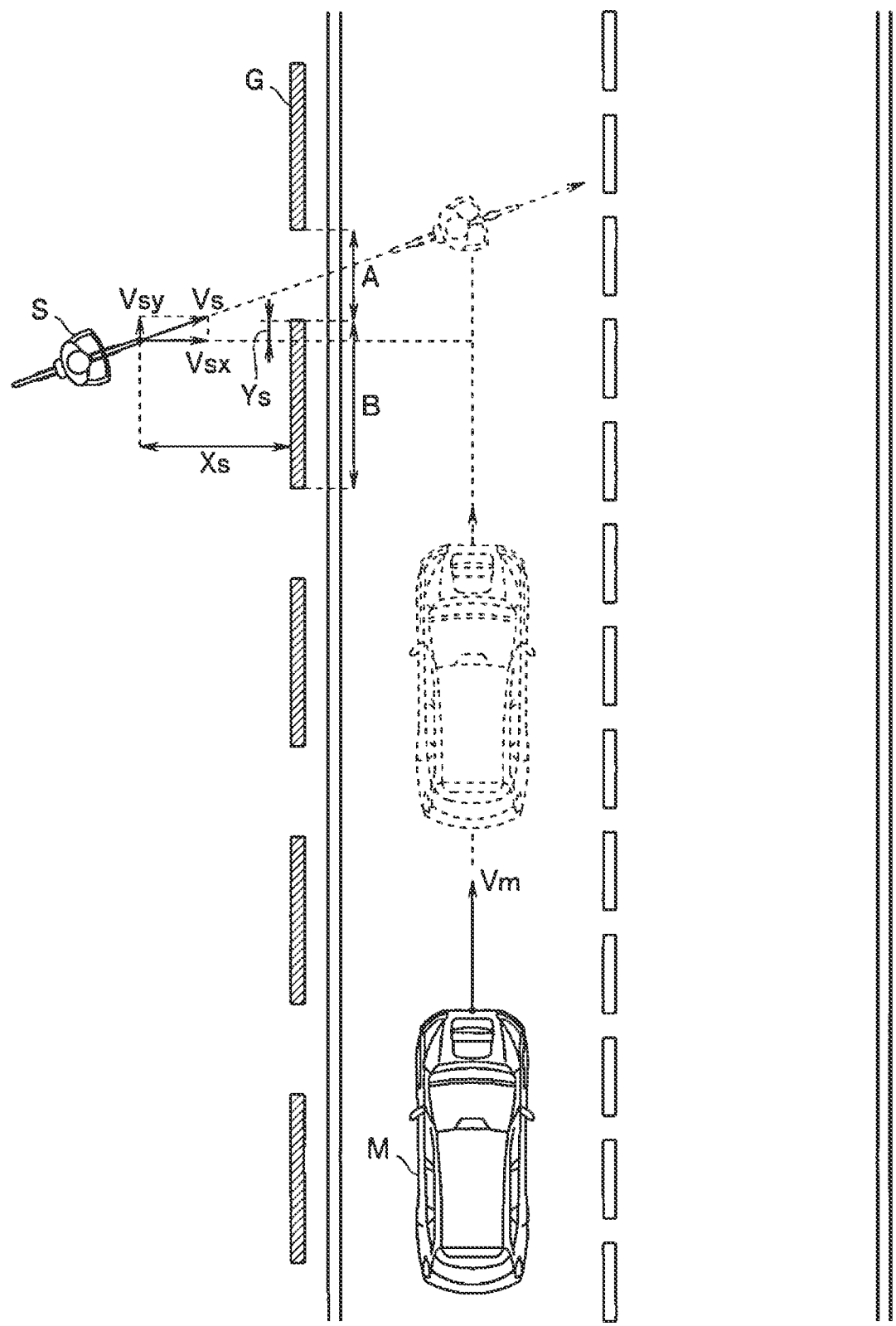
FIG. 10 is an explanatory diagram illustrating a case where the entry of the bicycle into the target vehicle traveling road is not blocked by a guardrail.

In Step S305, the traveling ECU 14 determines whether the moving object S (bicycle) is passable through the gap in the guardrail G based on, for example, the speed component Vsx in the lateral direction of the moving object S (bicycle), the speed component Vsy in the fore-and-aft direction, a distance Xs to the guardrail G in the lateral direction, a distance Ys to the gap in the fore-and-aft direction, and a width A of the gap (see FIG. 10).

Figure 11:
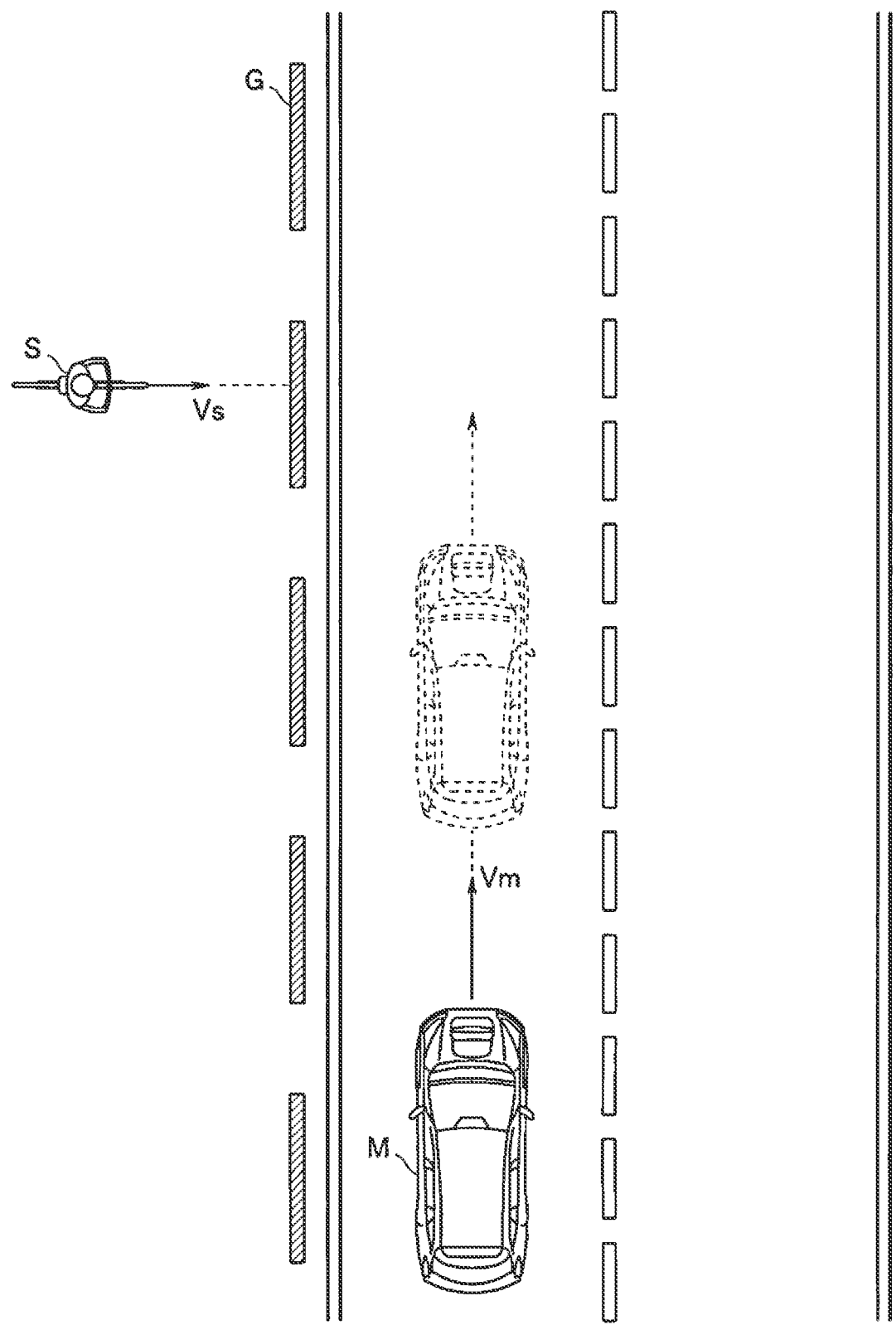
FIG. 11 is an explanatory diagram illustrating a case where the entry of the bicycle into the target vehicle traveling road is blocked by the guardrail.

For example, the traveling ECU 14 calculates a period Tg for the moving object S (bicycle) to reach the guardrail G based on the speed component Vsx in the lateral direction of the moving object S (bicycle) and the distance Ys to the guardrail G in the fore-and-aft direction. The traveling ECU 14 calculates a moving distance Yg of the moving object S (bicycle) in the fore-and-aft direction within the period Tg to reach the guardrail G based on the speed component Vsy in the fore-and-aft direction of the moving object S (bicycle). When the calculated moving distance Yg satisfies a relationship of "Ys<Yg<(Ys+A)", the traveling ECU 14 determines that the moving object S (bicycle) is passable through the guardrail G (see FIG. 10). When the guardrail G has no gap, the moving distance Yg satisfies a relationship of "Yg≤Ys", or the moving distance Yg satisfies a relationship of "(Ys+A)≤Yg", the traveling ECU 14 determines that the moving object S (bicycle) is impassable through the guardrail G (see FIG. 11).

In Step S306, the traveling ECU 14 checks whether the moving object S (bicycle) is passable through the guardrail G based on a result of the determination in Step S305.

When the moving object S (bicycle) is passable through the guardrail G based on the result of the determination in Step S305, the traveling ECU 14 terminates the subroutine after Step S306.

When the moving object S (bicycle) is impassable through the guardrail G based on the result of the determination in Step S305, the traveling ECU 14 proceeds to Step S312 after Step S306.

In Step S307 from Step S303, the traveling ECU 14 checks whether a curbstone C defining the inside and outside of the target vehicle traveling road is present in the moving direction of the moving object S (bicycle).

When determination is made in Step S307 that the curbstone C is not present in the moving direction of the moving object S (bicycle), the traveling ECU 14 terminates the subroutine.

When determination is made in Step S307 that the curbstone C is present in the moving direction of the moving object S (bicycle), the traveling ECU 14 proceeds to Step S308 to refer to the height of the curbstone C recognized as the traveling environment information.

In Step S309, the traveling ECU 14 detects a gap in the curbstone C (a break in the curbstone C). That is, the traveling ECU 14 checks whether the curbstone C has a gap where the moving object S (bicycle) is passable.

In Step S310, the traveling ECU 14 determines whether the moving object S (bicycle) is passable through the gap in the curbstone C based on, for example, the speed component Vsx in the lateral direction of the moving object S (bicycle), the speed component Vsy in the fore-and-aft direction, a distance Xs to the curbstone C in the lateral direction, a distance Ys to the gap in the fore-and-aft direction, and a width A of the gap. This determination is basically made similarly to the passage determination on the guardrail G, and therefore details thereof are omitted.

Figure 12:
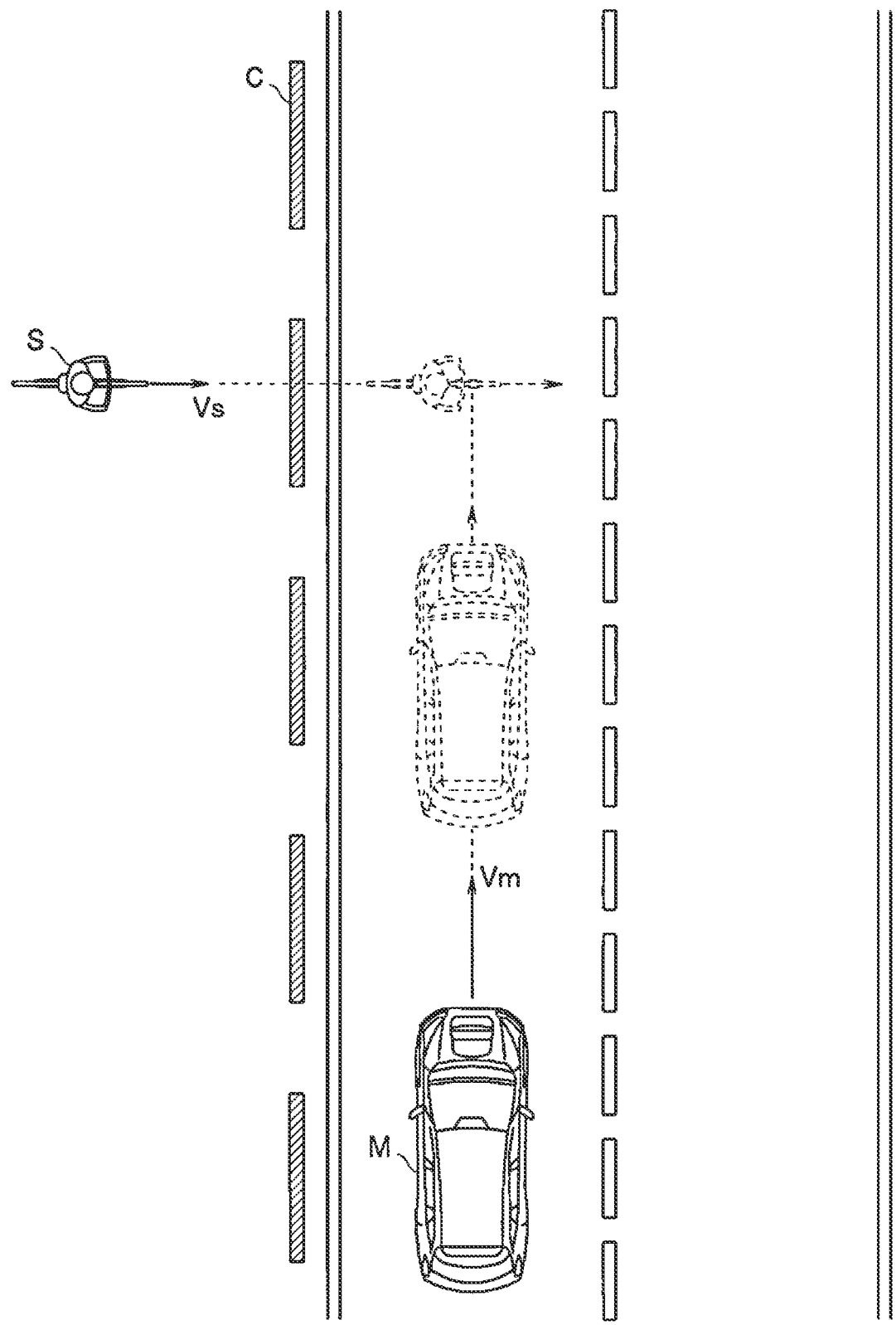
FIG. 12 is an explanatory diagram illustrating a case where the entry of the bicycle into the target vehicle traveling road is not blocked by a curbstone.

The traveling ECU 14 determines whether the moving object S (bicycle) is passable through the curbstone C based also on the height of the curbstone C and a tire radius of the bicycle that is the moving object S. That is, the traveling ECU 14 compares the height of the curbstone C with the tire radius of the bicycle. For example, when the height of the curbstone C is less than 30% of the tire radius of the bicycle, the traveling ECU 14 determines that the moving object S (bicycle) is passable over the curbstone C irrespective of whether the curbstone C has the gap (see FIG. 12).

In Step S311 from Step S310, the traveling ECU 14 checks whether the moving object S (bicycle) is passable through the curbstone C based on a result of the determination in Step S310.

When the moving object S (bicycle) is passable through the curbstone C based on the result of the determination in Step S310, the traveling ECU 14 terminates the subroutine after Step S311.

When the moving object S (bicycle) is impassable through the curbstone C based on the result of the determination in Step S310, the traveling ECU 14 proceeds to Step S312 after Step S311.

In Step S312 from Step S306 or S311, the traveling ECU 14 determines to cancel the emergency braking against the moving object S (bicycle) set as the current control target, and then terminates the subroutine.

In Step S313 from Step S302, the traveling ECU 14 checks whether a guardrail G defining the inside and outside of the target vehicle traveling road is present in the moving direction of the moving object S (pedestrian).

When determination is made in Step S313 that the guardrail G is not present in the moving direction of the moving object S (pedestrian), the traveling ECU 14 terminates the subroutine.

When determination is made in Step S313 that the guardrail G is present in the moving direction of the moving object S (pedestrian), the traveling ECU 14 proceeds to Step S314 to refer to the height of the guardrail G recognized as the traveling environment information.

Figure 13:
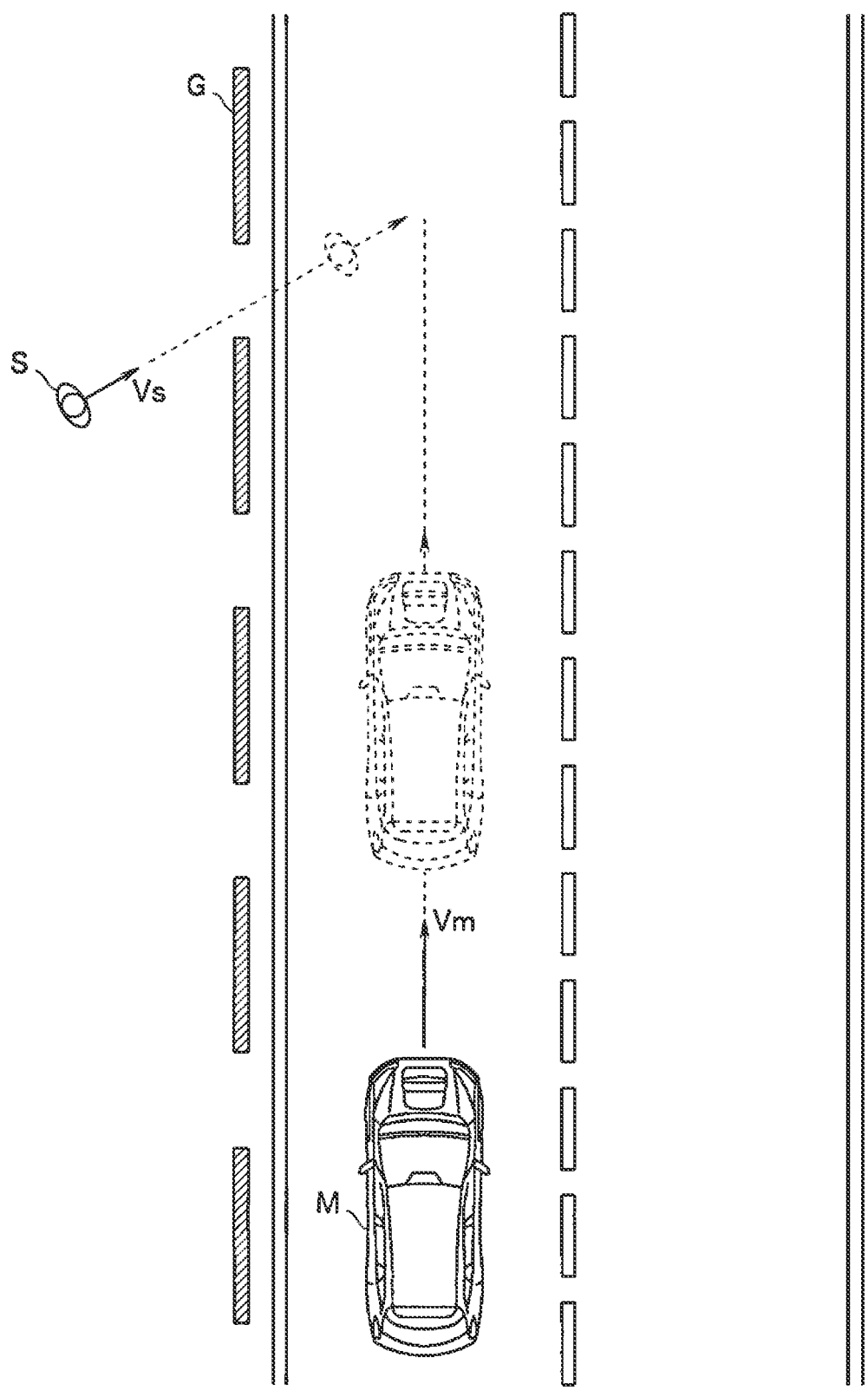
FIG. 13 is an explanatory diagram illustrating a case where entry of a pedestrian into the target vehicle traveling road is not blocked by the guardrail.
Figure 14:
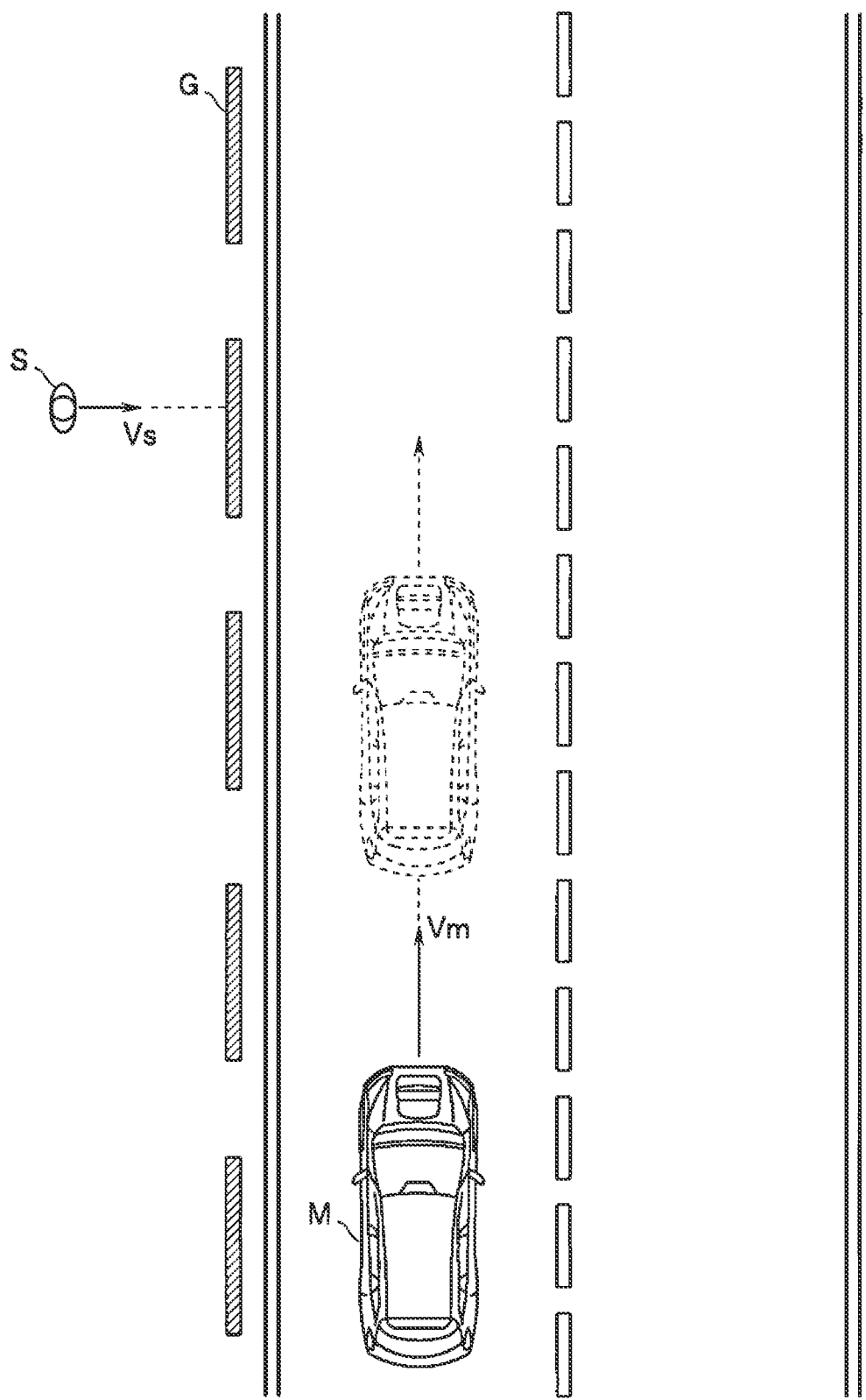
FIG. 14 is an explanatory diagram illustrating a case where the entry of the pedestrian into the target vehicle traveling road is blocked by the guardrail.

In Step S315, the traveling ECU 14 determines whether the moving object S (pedestrian) is passable through the gap in the guardrail G based on, for example, the speed component Vsx in the lateral direction of the moving object S (pedestrian), the speed component Vsy in the fore-and-aft direction, a distance Xs to the guardrail G in the lateral direction, a distance Ys to the gap in the fore-and-aft direction, and a width A of the gap (see FIGS. 13 and 14). This determination is basically made similarly to the passage determination on the guardrail G in the case where the moving object S is the bicycle. Therefore, details thereof are omitted.

Figure 15:
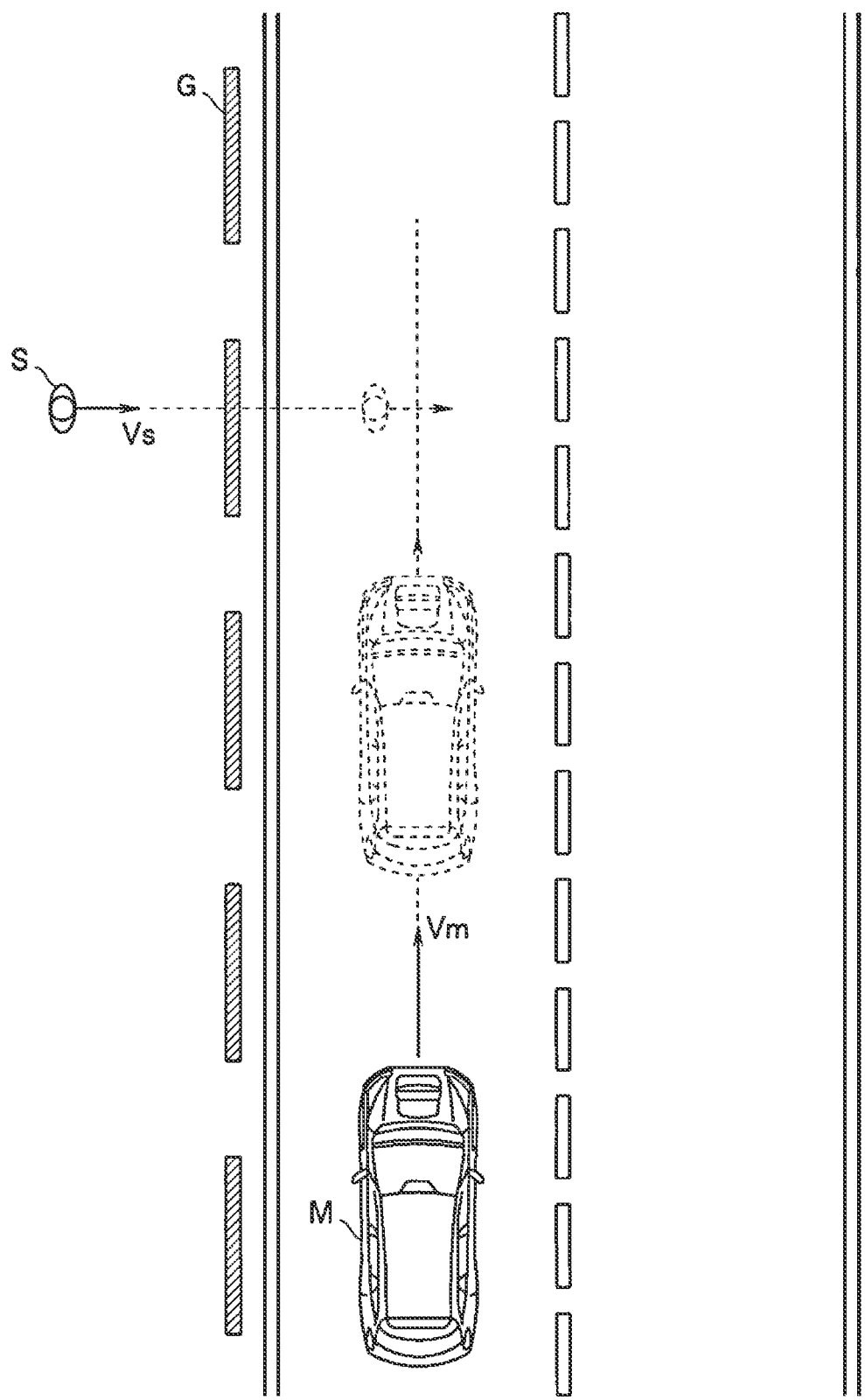
FIG. 15 is an explanatory diagram illustrating a case where the entry of the pedestrian into the target vehicle traveling road is not blocked by the guardrail.

The traveling ECU 14 determines whether the moving object S (pedestrian) is passable through the guardrail G based also on the height of the guardrail G. For example, when the height of the guardrail G is equal to or smaller than a preset height (for example, 50 cm), the traveling ECU 14 determines that the moving object S (pedestrian) is passable over the guardrail G irrespective of whether the guardrail G has the gap (see FIG. 15).

In Step S317 from Step S316, the traveling ECU 14 checks whether the moving object S (pedestrian) is passable through the guardrail G based on a result of the determination in Step S316.

When the moving object S (pedestrian) is passable through the guardrail G based on the result of the determination in Step S316, the traveling ECU 14 terminates the subroutine after Step S317.

When the moving object S (pedestrian) is impassable through the guardrail G based on the result of the determination in Step S316, the traveling ECU 14 proceeds to Step S318 after Step S317. The traveling ECU 14 determines to cancel the emergency braking against the moving object S (pedestrian) set as the current control target, and then terminates the subroutine.

In the main routine of FIG. 3, the traveling ECU 14 checks in Step S108 from Step S107 whether the cancellation condition for the emergency braking against the moving object S is satisfied based on a result of the determination in Step S107.

When the cancellation condition for the emergency braking against the moving object S is satisfied based on the result of the determination in Step S107, the traveling ECU 14 proceeds to Step S109 after Step S108.

When the cancellation condition for the emergency braking against the moving object S is not satisfied based on the result of the determination in Step S107, the traveling ECU 14 proceeds to Step S110 after Step S108.

In Step S109 from Step S105 or S108, the traveling ECU 14 alerts the driver that the target vehicle M has the possibility of colliding with the control target, and then terminates the routine. The alert in Step S109 may include alert braking (light braking) for the target vehicle M using a preset small deceleration a1 in addition to a preset audio or visual output.

In Step S110 from Step S106 or S108, the traveling ECU 14 executes the emergency braking (hard braking) for the target vehicle M against the control target by using a preset deceleration a2 (a2>a1), and then terminates the routine.

According to the embodiment, the traveling ECU 14 detects, based on the traveling environment information, the moving object S having the speed component from the outside of the target vehicle traveling road to the inside of the target vehicle traveling road, and determines whether the target vehicle M has the possibility of colliding with the moving object S based on the movement information of the target vehicle M and the movement information of the moving object S. In the driving assistance control for executing the emergency braking to avoid collision with the moving object S when the time-to-collision TTC that is the physical quantity indicating the correlation with the moving object S having the possibility of colliding with the target vehicle M is equal to or shorter than the second threshold Tth2, the traveling ECU 14 cancels the execution of the emergency braking when the structure (either one of the guardrail G and the curbstone C) that blocks the entry of the moving object S into the target vehicle traveling road is present on the movement path of the moving object S in a case where the time-to-collision TTC is equal to or shorter than the second threshold Tth2. Thus, it is possible to execute appropriate emergency braking control against the moving object outside the target vehicle traveling road without causing occupant's discomfort.

That is, the emergency braking is canceled when the moving object S such as the bicycle or the pedestrian outside the target vehicle traveling road is set as the control target for the emergency braking control and determination is made that there is obviously a small possibility of the entry of the moving object S into the target vehicle traveling road based on the structure such as the guardrail G or the curbstone C. Thus, the emergency braking can be executed against the moving object S having a strong possibility of entering the target vehicle traveling road while suppressing the execution of unwanted emergency braking.

In a case where the moving object S is the bicycle and the guardrail G is present on the movement path of the bicycle, the traveling ECU 14 basically cancels the execution of the emergency braking under the assumption that the guardrail G is the structure that blocks the entry of the bicycle into the target vehicle traveling road. In a case where the guardrail G has a gap where the bicycle is passable and the bicycle is moving toward the gap in the guardrail G, the traveling ECU 14 does not cancel the execution of the emergency braking. Thus, it is possible to execute appropriate emergency braking control against the bicycle moving outside the target vehicle traveling road without causing occupant's discomfort.

In a case where the moving object S is the bicycle and the curbstone C is present on the movement path of the bicycle, the traveling ECU 14 basically cancels the execution of the emergency braking under the assumption that the curbstone C is the structure that blocks the entry of the bicycle into the target vehicle traveling road. In a case where the curbstone C has a gap where the bicycle is passable and the bicycle is moving toward the gap in the curbstone C or the bicycle is passable over the curbstone C, the traveling ECU 14 does not cancel the execution of the emergency braking. Thus, it is possible to execute appropriate emergency braking control against the bicycle moving outside the target vehicle traveling road without causing occupant's discomfort.

In a case where the moving object S is the pedestrian and the guardrail G is present on the movement path of the pedestrian, the traveling ECU 14 basically cancels the execution of the emergency braking under the assumption that the guardrail G is the structure that blocks the entry of the pedestrian into the target vehicle traveling road. In a case where the guardrail G has a gap where the pedestrian is passable and the pedestrian is moving toward the gap in the guardrail G or the pedestrian is passable over the guardrail G, the traveling ECU 14 does not cancel the execution of the emergency braking. Thus, it is possible to execute appropriate emergency braking control against the pedestrian moving outside the target vehicle traveling road without causing occupant's discomfort.

In a case where the emergency braking is canceled, the predetermined alert is issued against either one of the bicycle and the pedestrian moving outside the target vehicle traveling road. Thus, it is possible to call the driver's attention to unexpected entry of either one of the bicycle and the pedestrian.

In the embodiment described above, the IPU 12, the image recognition ECU 13, the traveling ECU 14, the CP_ECU 21, the E/G_ECU 22, the T/M_ECU 23, the BK_ECU 24, and the PS_ECU 25 are each implemented by a known microcomputer including a CPU, a RAM, a ROM, and a non-volatile storage and peripheral devices around the microcomputer. The ROM prestores programs to be executed by the CPU and fixed data such as data tables. All or a part of the functions of the processor may be implemented by a logic or analog circuit, and processes in various programs may be implemented by an electronic circuit such as an FPGA.

The embodiment of the disclosure is not limited to the embodiment described above, and various modifications may be made without departing from the gist in the implementation. The embodiment includes various aspects of the disclosure that may be extracted by any appropriate combination of a plurality of disclosed constituent elements.

For example, some of the constituent elements in the embodiment may be omitted as long as the problems described above can be solved and the effects described above can be attained.

The traveling ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving assistance device for a vehicle, the driving assistance device comprising:

a traveling environment recognizer configured to recognize traveling environment information related to outside the vehicle;
an object detector configured to:
  based on the traveling environment information, detect an object moving outside a road on which the vehicle is traveling; and
  in response to detecting the object moving outside the road, detect that the object has a speed component from outside the road to inside the road;
a collision determiner configured to determine, in response to detecting that the object has the speed component from outside the road to inside the road, whether the object has a possibility of colliding with the vehicle, based on movement information of the vehicle and movement information of the moving object;
an emergency braking executor configured to:
  in response to determining that the object has the possibility of a collision with the vehicle, determine that the moving object is an obstacle;
  determine that the obstacle has a first speed component in a fore-and-aft direction of the vehicle and a second speed component in a width direction of the vehicle, and the first speed component is greater than the second speed component;
  in response to determining that the first speed component is not greater than the second speed component, determine that a structure that blocks entry of the obstacle into the road is present on a movement path of the obstacle;
  in response to determining that the structure that blocks entry of the obstacle into the road is not present on the movement path of the obstacle, perform the execution of the emergency braking to avoid the collision with the obstacle;
  in response to determining that the structure that blocks entry of the obstacle into the road is present on the movement path of the obstacle, determine that the structure has a gap through which the obstacle enters the road;
  in response to determining that the structure has the gap through which the obstacle enters the road, determine that the obstacle is expected to pass through the gap in the structure based on the first speed component in the fore-and-aft direction of the vehicle, the second speed component in the width direction of the vehicle, a first distance to the structure from the vehicle in the width direction, a second distance to the gap from the vehicle in the fore-and-aft direction, and a width of the gap; and
  in response to determining that the obstacle is expected to pass through the gap in the structure, perform execution of emergency braking to avoid the collision with the obstacle; and
a canceler configured to cancel, in response to determining that the structure that blocks entry of the obstacle into the road is present on the movement path of the obstacle, the execution of the emergency braking.

2. The driving assistance device for the vehicle according to claim 1,
  wherein the moving object is a bicycle, and
  wherein the canceler is configured to cancel the execution of the emergency braking in a case where a guardrail is present on the movement path of the bicycle.

3. The driving assistance device for the vehicle according to claim 1,
  wherein the moving object is a bicycle, and
  wherein the canceler is configured to cancel the execution of the emergency braking in a case where a curbstone having a preset height or more is present on the movement path of the bicycle.

4. The driving assistance device for the vehicle according to claim 1,
  wherein the moving object is a pedestrian, and
  wherein the canceler is configured to cancel the execution of the emergency braking when a guardrail having a preset height or more is present on the movement path of the pedestrian.

5. A driving assistance device for a vehicle, the driving assistance device comprising circuitry configured to:
  recognize traveling environment information related to outside the vehicle;
  based on the traveling environment information, detect an object moving outside a road on which the vehicle is traveling;
  in response to detecting the object moving outside the road, detect that the object has a speed component from outside the road to inside the road;
  in response to detecting that the object has the speed component from outside the road to inside the road, determine whether the object has a possibility of colliding with the vehicle, based on movement information of the vehicle and movement information of the object;
  in response to determining that the object has the possibility of a collision with the vehicle, determine that the moving object is an obstacle;
  determine that the obstacle has a first speed component in a fore-and-aft direction of the vehicle and a second speed component in a width direction of the vehicle, and the first speed component is greater than the second speed component;
  in response to determining that the first speed component is not greater than the second speed component, determine that a structure that blocks entry of the obstacle into the road is present on a movement path of the obstacle;
  in response to determining that the structure that blocks entry of the obstacle into the road is not present on the movement path of the obstacle, perform execution of emergency braking to avoid the collision with the obstacle;
  in response to determining that the structure that blocks entry of the obstacle into the road is present on the movement path of the obstacle, cancel the execution of the emergency braking;
  in response to determining that the structure that blocks entry of the obstacle into the road is present on the movement path of the obstacle, determine that the structure has a gap through which the obstacle enters the road;
  in response to determining that the structure has the gap through which the obstacle enters the road, determine that the obstacle is expected to pass through the gap in the structure based on the first speed component in the fore-and-aft direction of the vehicle, the second speed component in the width direction of the vehicle, a first distance to the structure from the vehicle in the width direction, a second distance to the gap from the vehicle in the fore-and-aft direction, and a width of the gap; and in response to determining that the obstacle is expected to pass through the gap in the structure, perform the execution of the emergency braking to avoid the collision with the obstacle.

\* \* \* \* \*